(12) United States Patent
Singh et al.

(10) Patent No.: US 9,189,965 B2
(45) Date of Patent: Nov. 17, 2015

(54) ENHANCING POSTED CONTENT IN DISCUSSION FORUMS

(75) Inventors: Amit K. Singh, Bangalore (IN); Rose Catherine Kanjirathinkal, Bangalore (IN); Sachindra Joshi, New Delhi (IN); Ankur Gandhe, Bangalore (IN); Karthik Visweswariah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 13/538,899

(22) Filed: Jun. 29, 2012

(65) Prior Publication Data
US 2014/0004495 A1  Jan. 2, 2014

(51) Int. Cl.
*G09B 7/02* (2006.01)

(52) U.S. Cl.
CPC ........................................ *G09B 7/02* (2013.01)

(58) Field of Classification Search
CPC ........................................................ G09B 7/00
USPC ......................................... 434/322; 709/206
See application file for complete search history.

(56) References Cited

U.S. PATENT DOCUMENTS

| | | | |
|---|---|---|---|
| 6,209,100 B1 | 3/2001 | Robertson et al. | |
| 6,687,696 B2 | 2/2004 | Hofmann et al. | |
| 7,197,470 B1 | 3/2007 | Arnett et al. | |
| 7,328,216 B2 | 2/2008 | Hofmann et al. | |
| 7,933,859 B1 | 4/2011 | Puzicha et al. | |
| 8,140,983 B2 | 3/2012 | Brantley et al. | |
| 8,171,087 B2 | 5/2012 | Carrer et al. | |
| 8,201,095 B2* | 6/2012 | Dewar et al. | 715/759 |
| 2006/0242190 A1 | 10/2006 | Wnek | |
| 2007/0067405 A1 | 3/2007 | Eliovson | |
| 2008/0082607 A1 | 4/2008 | Sastry et al. | |
| 2008/0208975 A1 | 8/2008 | Olive | |
| 2009/0024488 A1* | 1/2009 | Romley | 705/26 |
| 2009/0063991 A1 | 3/2009 | Baron et al. | |
| 2009/0083200 A1 | 3/2009 | Pollara et al. | |
| 2009/0164416 A1 | 6/2009 | Guha | |
| 2009/0265607 A1 | 10/2009 | Raz et al. | |
| 2010/0082751 A1 | 4/2010 | Meijer et al. | |
| 2010/0162135 A1 | 6/2010 | Wanas et al. | |
| 2010/0293560 A1* | 11/2010 | Bland et al. | 719/328 |
| 2011/0131085 A1 | 6/2011 | Wey | |
| 2011/0161182 A1* | 6/2011 | Racco | 705/14.73 |
| 2011/0179130 A1 | 7/2011 | Sapek | |
| 2011/0191105 A1 | 8/2011 | Spears | |
| 2012/0102153 A1* | 4/2012 | Kemp et al. | 709/219 |
| 2012/0124149 A1* | 5/2012 | Gross et al. | 709/206 |

(Continued)

OTHER PUBLICATIONS

White, Ryen, W., "Implicit Feedback for Interactive Information Retrieval," Doctoral Dissertation, Department of Computing Science, Faculty of Computing Science, Mathematics and Statistics, University of Glasgow, Oct. 2004, 302 pages.

(Continued)

*Primary Examiner* — Kevin Bates
*Assistant Examiner* — Chen-Liang Huang
(74) *Attorney, Agent, or Firm* — Ference & Associates LLC

(57) ABSTRACT

Methods and arrangements for enhancing content in discussion forums. Access to an online discussion is provided. A posting by an author participating in the discussion is accepted, and a recommendation is automatically produced for the author for amending the posting to increase the likelihood of response to the posting by other individuals participating in the discussion.

11 Claims, 6 Drawing Sheets

(56) References Cited

U.S. PATENT DOCUMENTS

2012/0158611 A1* 6/2012 Pulito et al. .................. 705/347
2012/0166532 A1* 6/2012 Juan et al. .................... 709/204

OTHER PUBLICATIONS

Kim, J. et al, "Using Implicit Feedback for User Modeling in Internet and Intranet Searching," Technical Report CLIS-TR-00-01, May 1, 2000, pp. 1-21, College of Library and Information Services, University of Maryland, College Park MD, USA.

Tan, Bin, "A Study of Language Models for Exploiting User Feedback in Information Retrieval," Doctoral Dissertation, Department of Computer Science in the Graduate College of the University of Illinois at Urbana-Champaign, 2009, 98 pages, Urbana, Illinois, USA.

Fox, Steve et al., "Evaluating Implicit Measure to Improve Web Search," ACM Transactions on Information Systems, Apr. 2005, pp. 147-168, vol. 23, No. 2, ACM, New York, New York, USA.

* cited by examiner

ENHANCING POSTED CONTENT IN DISCUSSION FORUMS

BACKGROUND

Generally, online discussion sites, community question answering sites and the like provide a valuable source of information for users. However, very little is usually done, once a question is posted on forums, to assist in obtaining answers, apart from possibly routing the information to experts. As a result, many if not most discussions fail to progress for a variety of reasons, leading to a plethora of sparse, and unhelpful and uninformative, discussion threads. Among these reasons are an insufficiency of content (e.g., there is little to no telltale information in a headpost [e.g., title+first post] to attract a viable reply), a duplication of questions (e.g., a question has already been answered elsewhere); and a poorly organized or referenced question (e.g., it is posted in the wrong place).

BRIEF SUMMARY

In summary, one aspect of the invention provides a method comprising: availing an online discussion; assimilating a posting by an author in the discussion; and producing for the author a recommendation for amending the posting to increase a likelihood of response to the posting.

Another aspect of the invention provides an apparatus comprising: at least one processor; and a computer readable storage medium having computer readable program code embodied therewith and executable by the at least one processor, the computer readable program code comprising: computer readable program code configured to avail an online discussion; computer readable program code configured to assimilate a posting by an author in the discussion; and computer readable program code configured to produce for the author a recommendation for amending the posting to increase a likelihood of response to the posting.

An additional aspect of the invention provides a computer program product comprising: a computer readable storage medium having computer readable program code embodied therewith, the computer readable program code comprising: computer readable program code configured to avail an online discussion; computer readable program code configured to assimilate a posting by an author in the discussion; and computer readable program code configured to produce for the author a recommendation for amending the posting to increase a likelihood of response to the posting.

A further aspect of the invention provides a method comprising: entering an online discussion; adding a posting to the discussion; and receiving a recommendation for amending the posting to increase a likelihood of response to the posting.

One aspect of the invention provides a method comprising: providing access to an online discussion; accepting a posting by an author participating in the discussion; and automatically producing for the author a recommendation for amending the posting to increase the likelihood of response to the posting by other individuals participating in the discussion.

Another aspect of the invention provides an apparatus comprising: at least one processor; and a computer readable storage medium having computer readable program code embodied therewith and executable by the at least one processor, the computer readable program code comprising: computer readable program code configured to provide access to an online discussion; computer readable program code configured to accept a posting by an author participating in the discussion; and computer readable program code configured to automatically produce for the author a recommendation for amending the posting to increase the likelihood of response to the posting by other individuals participating in the discussion.

An additional aspect of the invention provides a computer program product comprising: a computer readable storage medium having computer readable program code embodied therewith, the computer readable program code comprising: computer readable program code configured to provide access to an online discussion; computer readable program code configured to accept a posting by an author participating in the discussion; and computer readable program code configured to automatically produce for the author a recommendation for amending the posting to increase the likelihood of response to the posting by other individuals participating in the discussion.

A further aspect of the invention provides a method comprising: entering an online discussion; adding a posting to the discussion; automatically receiving a recommendation for amending the posting to increase a likelihood of response to the posting, wherein the recommendation addresses at least one member selected from the group consisting of: insufficiency of content, duplicative content, and organization of content; and amending the posting.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
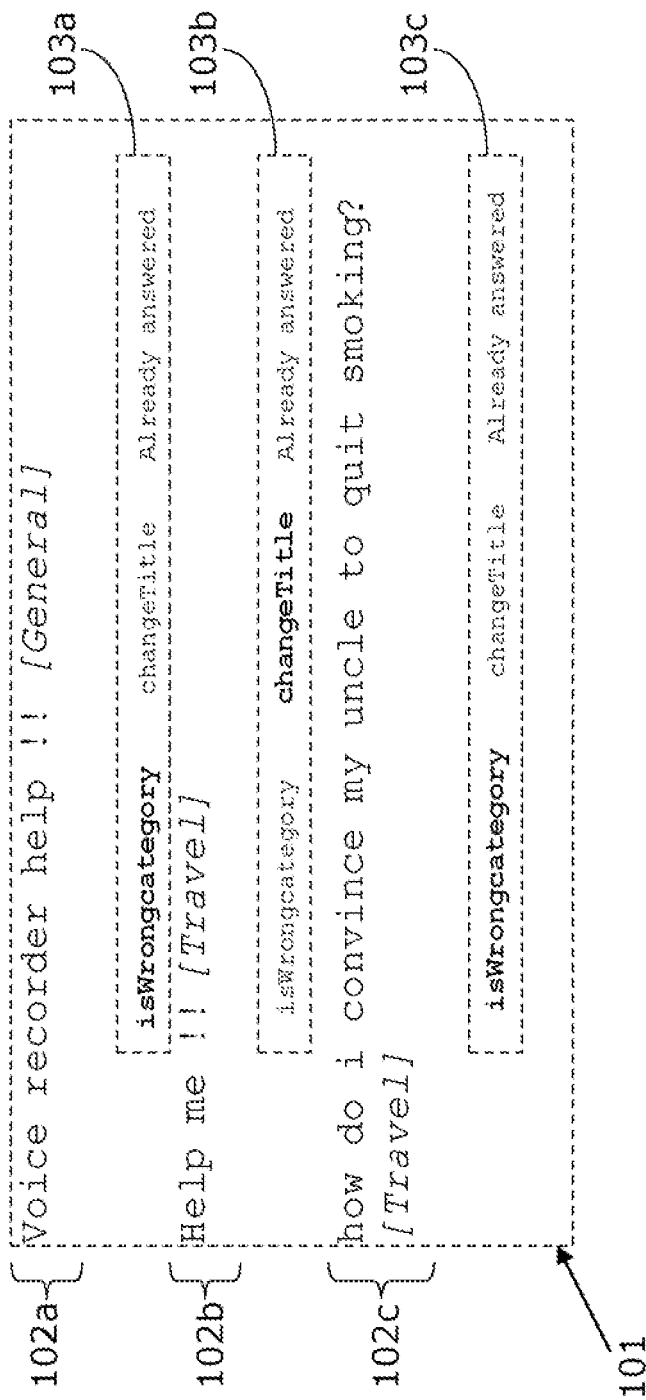
FIG. 1 schematically illustrates a screenshot of a home page.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

Figure 2:
FIG. 2 schematically illustrates a screenshot of a detailed graphical user interface (GUI) view.
Figure 3:
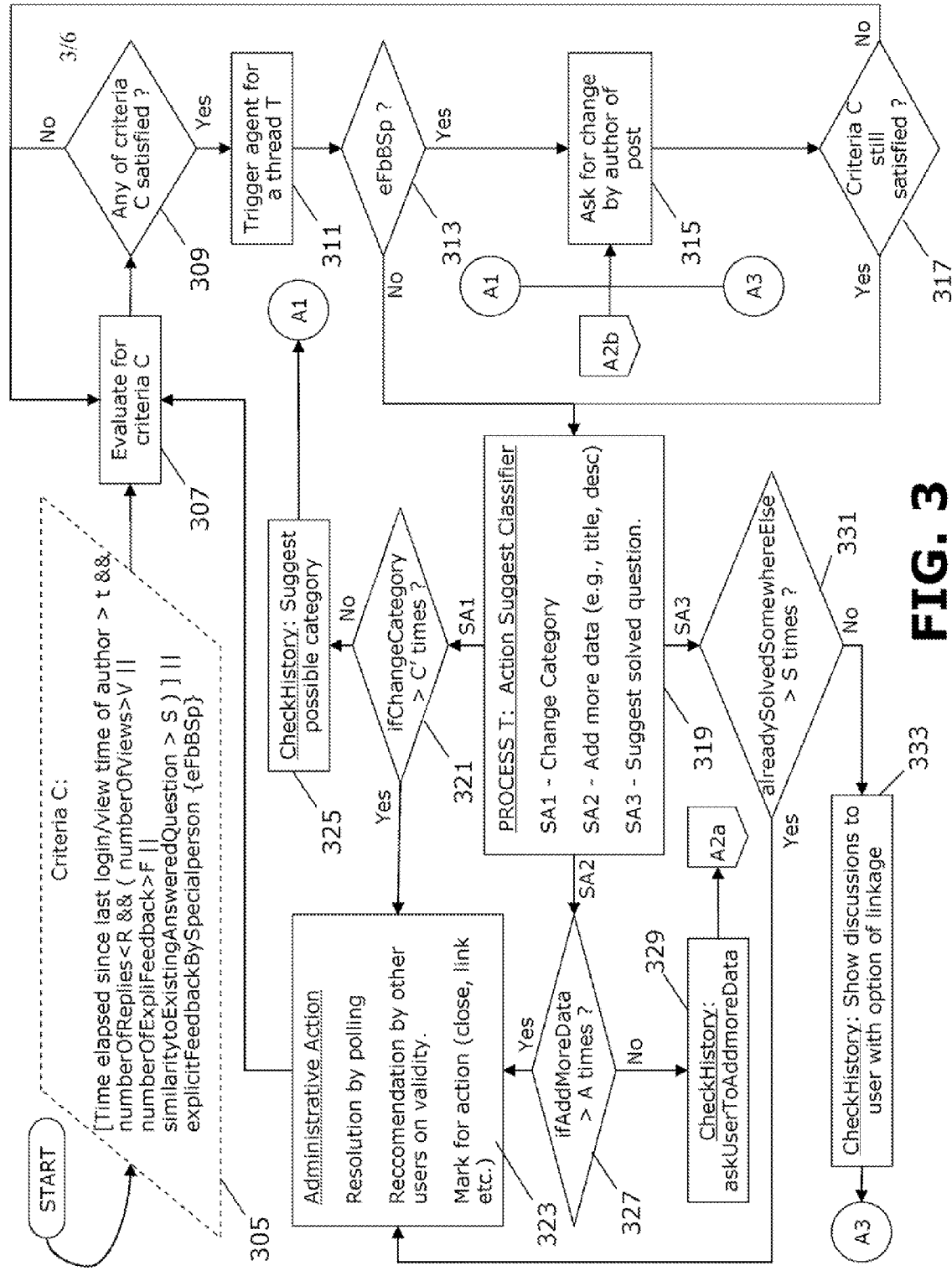
FIG. 3 schematically illustrates a process flow.
Figure 4:
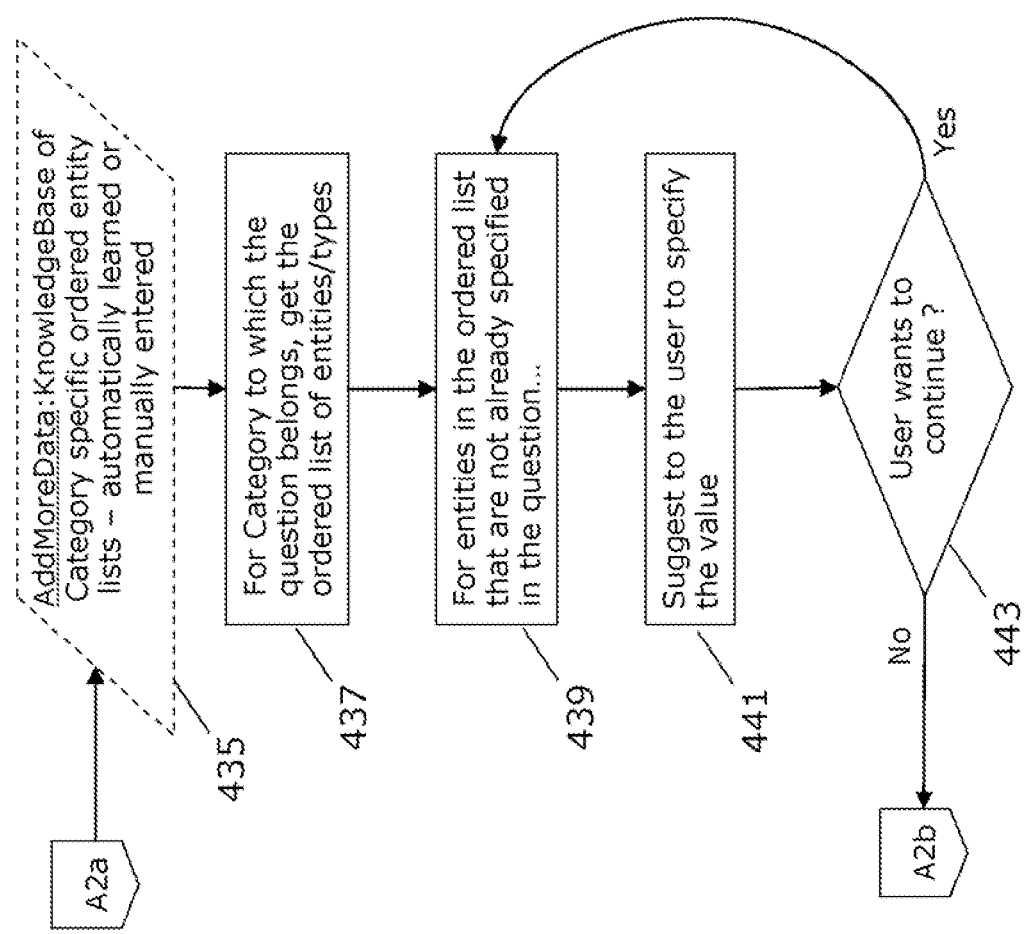
FIG. 4 schematically illustrates a process flow for adding more data.

To facilitate easier reference, in advancing from FIG. 1 to and through FIG. 4, a reference numeral is advanced by a multiple of 100 in indicating a substantially similar or analogous component or element with respect to at least one component or element found in at least one earlier figure among FIGS. 1-4.

Broadly contemplated herein, in accordance with at least one embodiment of the invention, is an automated agent for monitoring discussions and making suggestions by way of improving a likelihood of receiving a reply. As such, the agent provides suggestions to authors of a thread to improve the likelihood of getting responses. Such suggestions can include, but are not limited to: changing the title, changing the description and changing the category. For descriptions, suggestions can be made as to how the description could be made more specific.

Accordingly, and proceeding along these lines, FIG. 1 schematically illustrates a screenshot of a home page 101 of a discussion forum, in accordance with at least one embodiment of the invention. In a manner to be explained more fully below, discussion questions 102*a/b/c* can appear on the home page 101, which have each been posted by a user, along with a user's indication of a category (e.g., "general", "travel"). Below each question 102*a/b/c*, a corresponding resolution field 103*a/b/c* can display different possibilities for resolving a problem with the question. By way of an illustrative example, each resolution field 104*a/b/c* here contains three possibilities that each may be highlighted by way of seeking user input for resolution: "is Wrongcategory", "changeTitle" and "Already answered". For question 102*a* as shown here, "is Wrongcategory" is highlighted in resolution field 103*a* (with "changeTitle" and "Already answered" not being highlighted) to the extent that an automated agent or engine, in a manner to be discussed more fully below, has served to ascertain that this is a problem with question 102*a* that needs to be resolved. Thus, a user will be invited to provide feedback for a category other than "general". For question 102*b*, "changeTitle" is highlighted in field 103*b* to invite suggestions for new discussion titles (to replace "Help me!!"), while question 102*c* presents another example of a question that yields a highlighting of "is Wrongcategory" in field 103*c*.

In accordance with at least one embodiment of the invention, it should be noted that feedback as described above can be solicited from any users, not just the one who posted a question. It should also be understood that while the screenshot in FIG. 1 shows only questions that require resolution, and could be embodied, e.g., by a special or optional display that might be reached from a main page where there would have been an option offered to go to a page for questions needing resolution, the screenshot could alternatively be shown on a main or home page itself. Resolution fields 103*a/b/c*, for their part, need only show indicators or possibilities for resolving a question that are determined by the system (or otherwise predetermined) as being important, or which the system is confident about, as opposed to showing all possible indicators or possibilities.

FIG. 2 schematically illustrates a screenshot of a detailed graphical user interface (GUI) view 201, in accordance with at least one embodiment of the invention. Particularly, view 201 can result from clicking on an individual discussion question such as those indicated at 102*a/b/c* in FIG. 1. Among the fields in this view are question title (204), question contents (206), name of the poster (208), category (244) and feedback (246). The feedback field (246) permits users, including the original poster, to click on one or more possibilities (e.g., "is Wrongcategory", "needsMoreDescription", etc.) by way of suggesting a most likely remedy for improving presentation of the question. The "Pass" option can represent an option of foregoing input on the question and thus ignoring the question.

FIG. 3 schematically illustrates a general process flow, in accordance with at least one embodiment of the invention. Generally, an automated agent or engine can capture implicit feedback and explicit feedback. Implicit feedback can include a posting time, the time elapsed since a posting, and the number of views organized by viewers. Classification parameters for the number of views can include "is RegisteredUser" and an expert level, such as "is Expert" or "is ExpertinCategoryPosted".

In accordance with at least one embodiment of the invention, among other implicit feedback features that can be captured are the content of question with respect to an existing repository and the last login time or view time of the user who posted the question (e.g., by way of prioritizing new explicit feedback). Other implicit feedback features can include the characteristics of a question that is answered in a short time span. Such characteristics can include entity types for which values are specified (either in the question post or when the discussion evolved over time), an ordering for such entity types according to how much they contribute in increasing a probability of response, and category-specific characteristics. To this last point, by way of an illustrative example, for a discussion on forums seeking a place to stay, characteristics such as accommodation type and budget might be important for getting replies.

In accordance with at least one embodiment of the invention, explicit feedback can include a number of users, feedback factored by user type, e.g., "is Wrongcategory?", "changeTitle?", "AddMoreDescription?", "Already answered?". Explicit feedback can also be provided by a designated individual, such as a moderator.

In accordance with at least one embodiment of the invention, a classifier can be built to act with respect to any and all of the explicit and implicit features mentioned herein, or other or analogous features.

Proceeding with specifics of the process flow in FIG. 3, in accordance with at least one embodiment of the invention, criteria C (305) are evaluated (307). By way of an illustrative example, the criteria can involve:

whether the time elapsed since a last login or view time of an author is greater than a threshold t, AND the number of replies to the question is less than a threshold R, AND: the number of views of the question is greater than a threshold V OR the number of times explicit feedback has been provided is greater than a threshold F OR a degree of similarity with respect to an existing answered question is greater than a threshold (e.g., a predetermined quantifiable similarity metric) S; OR explicit feedback has been provided by a predetermined "special person" or other designated individual. (For instance, the "special person" could be an administrator, a moderator, or a prominent or widely recognized user.)

In accordance with at least one embodiment of the invention, if (309) none of the criteria C are satisfied, then the process reverts to step 307 and a reevaluation for criteria C takes place at another predetermined time, e.g., after a predetermined regular interval. Otherwise, the automated resolution agent is triggered for a thread T (311).

Generally, essentially any suitable input factors can be considered for triggering an agent for a thread T (step 311), in accordance with at least one embodiment of the invention. In other words, instead of the precise set of constraints and conditions discussed herein with regard to criteria C (305) (which are discussed by way of an illustrative and non-restrictive example), any of a variety of input factors could be considered individually or in any suitable combination as possibly serving to trigger a thread T. Such input factors could include any or all of those discussed herein with respect to criteria C (305) or could include one or more other suitable factors, such as one or more technical or business constraints.

In accordance with at least one embodiment of the invention, if explicit feedback has been provided by a "special person" (313), a change is then requested by the author of the post (315). If criteria C are no longer satisfied, then the process reverts to step 307. Otherwise, or alternatively if at step 313 the answer was "no", a processing of thread T is undertaken 319. Here, one of three (one or more) actions is suggested by the automated agent: SA1 (change category), SA2 (add more data) or SA3 (suggest solved question, e.g., a question already in repository is semantically similar to a current questions and is ascertained as having a significant number of replies with potential solutions). If SA1, and if (321) the category has not been changed a number of times above a threshold C, a "check history" process is invoked and the agent suggests to the user a possible category (325) from a historical database, and then reverts to step 315. If SA2, and if (327) data have not been added a number of times above a threshold A, a "check history" process is invoked and the agent acts to ask the user to add more data (329) via a process described in more detail herebelow with respect to FIG. 4. If SA3, and if (331) the question has not already been solved elsewhere above a threshold of S times, then a "check history" process is invoked and the agent shows to the user one or more other discussions, while offering a possibility of linkage to such discussions (333), and then reverts to step 315.

In accordance with at least one embodiment of the invention, if the thresholds at steps 321, 327 or 331 are exceeded, then a process of administrative action is undertaken, which could involve any or all of the following actions: resolution sought by a polling of multiple users; a recommendation by others users on validity (e.g., wherein one or more users will have indicated that one or more changes is in good order and/or can assist in making changes); and marking for action (close the question, link elsewhere, etc.). The process then reverts to step 307.

FIG. 4 schematically illustrates a process flow for adding more data, in accordance with at least one embodiment of the invention, as following from step 329 of FIG. 3. As shown, a knowledge base of category-specific ordered entity lists is consulted, this having been already automatically learned or manually entered (435). For a category to which the question belongs, an ordered list of entities and types is obtained (437). (For instance, by way of an illustrative and non-restrictive example, if the category is "places to stay New York" then some entities of interest could be: "accommodation type: hotel/B&B/house/youth hostel", "price: range", "size of space: _____"; "amenities: [parking, pool, etc.]; location in city: [near Central Park, near Times Square, etc.].) For entities in the ordered list that are not already specified in the question (439), a suggestion is made to a user (which could be the author of the post and/or any other users) to specify a value (441) (which, e.g., could be a value or entry for any entities/types such as those obtained in step 437, e.g., a price, or a drop-down list of available options [with an option for manual input] for a location). If (443) the user wishes to continue, then the process reverts to step 439; otherwise, it reverts to step 315 in FIG. 3.

Figure 5:
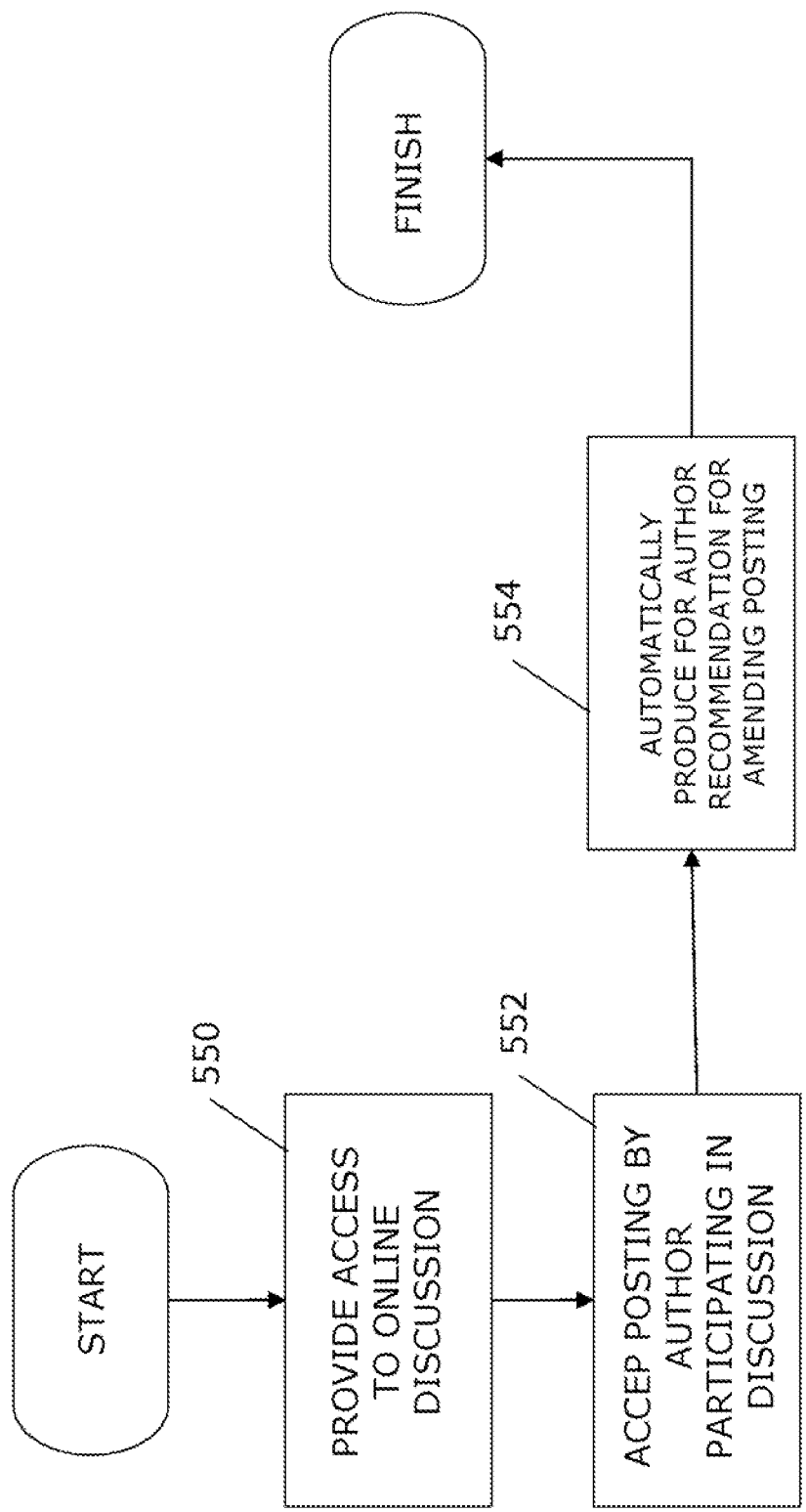
FIG. 5 sets forth a process more generally for enhancing content in discussion forums.

FIG. 5 sets forth a process more generally for enhancing content in discussion forums, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 5 can be performed by way a processing unit or units and system memory such as those indicated, respectively, at 16' and 28' in FIG. 6.

As shown in FIG. 5, in accordance with at least one embodiment of the invention, access to an online discussion is provided (550). A posting by an author participating in the discussion is accepted (552), and a recommendation is automatically produced for the author for amending the posting to increase the likelihood of response to the posting by other individuals participating in the discussion (554).

Figure 6:
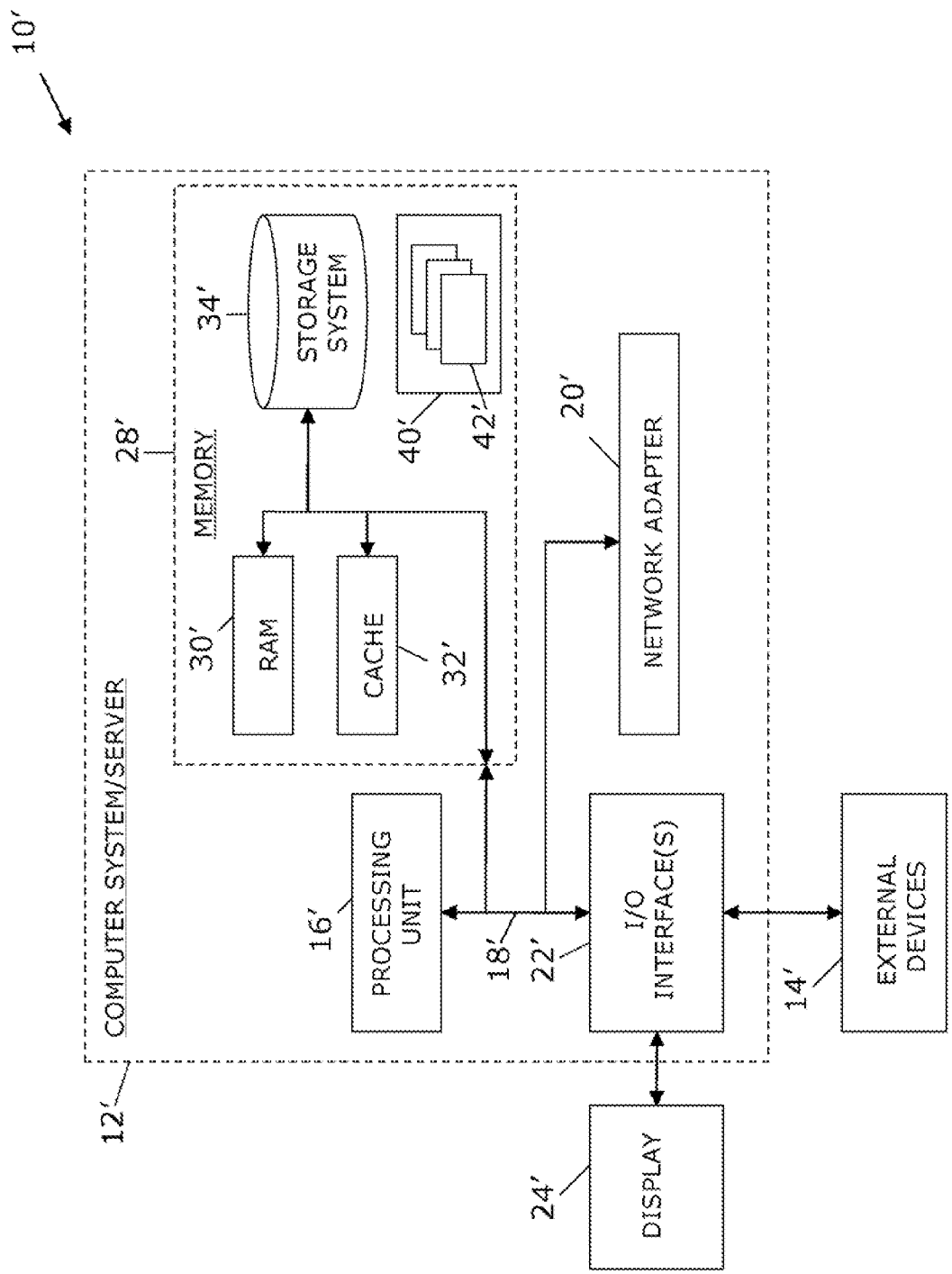
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. An apparatus comprising:
   at least one processor; and
   a computer readable storage medium having computer readable program code embodied therewith and executable by the at least one processor, the computer readable program code comprising:
   computer readable program code configured to provide access to an online discussion, wherein the online discussion includes one or more threads;
   computer readable program code configured to accept, for the one or more threads of the online discussion:
      a posting by an author participating in the discussion; and
      one or more responses to the posting by other individuals participating in the discussion; and
   computer readable program code configured to automatically produce for the author a recommendation for amending the posting to increase the likelihood of response to the posting by other individuals participating in the discussion via:
   triggering an agent based on fulfillment of at least one predetermined criterion;
   the at least one predetermined criterion being based on:
      time elapsed since a last login or view time by the author;
      a number of replies to the posting; and
      at least one of: a number of views of the posting, a number of times that explicit feedback has been provided by at least one other individual, and a degree of similarity with respect to an existing posting; and
   thereafter employing the agent to make a determination for performing at least one of: providing explicit feedback from at least one other individual, and classifying the posting to suggest further action to the author.

2. A computer program product comprising:
   a computer readable storage medium having computer readable program code embodied therewith, the computer readable program code comprising:
   computer readable program code configured to provide access to an online discussion;
   computer readable program code configured to provide access to an online discussion, wherein the online discussion includes one or more threads;
   computer readable program code configured to accept, for the one or more threads of the online discussion:
      a posting by an author participating in the discussion; and
      one or more responses to the posting by other individuals participating in the discussion; and
   computer readable program code configured to automatically produce for the author a recommendation for amending the posting to increase the likelihood of response to the posting by other individuals participating in the discussion via:

triggering an agent based on fulfillment of at least one predetermined criterion;

the at least one predetermined criterion being based on:
  time elapsed since a last login or view time by the author;
  a number of replies to the posting; and
  at least one of: a number of views of the posting, a number of times that explicit feedback has been provided by at least one other individual, and a degree of similarity with respect to an existing posting; and thereafter employing the agent to make a determination for performing at least one of: providing explicit feedback from at least one other individual, and classifying the posting to suggest further action to the author.

3. The computer program product according to claim 2, wherein the posting comprises a question.

4. The computer program product according to claim 2, wherein the recommendation addresses at least one member selected from the group consisting of: insufficiency of content; duplicative content; and organization of content.

5. The computer program product according to claim 2, wherein the recommendation comprises at least one member selected from the group consisting of: change in title of the content; change in content description; change in content category; and indication of a question already answered.

6. The computer program product according to claim 2, wherein said computer readable program code is configured to solicit explicit feedback from a designated individual other than the author.

7. The computer program product according to claim 2, wherein said computer readable program code is configured to solicit user feedback.

8. The computer program product according to claim 2, wherein said computer readable program code is configured to prompt administrative action in response to a predetermined trigger.

9. The computer program product according to claim 2, wherein said classifying comprises classifying the posting towards at least one of: suggesting a change in category in the posting, suggesting an addition of more data to the posting, and directing to a previously submitted response.

10. The computer program product according to claim 2, wherein the at least one predetermined criterion is based on at least one of:
  whether time elapsed since a last login or view time by the author is greater than a predetermined threshold;
  whether a number of replies to the posting is less than a predetermined threshold;
  whether a number of views of the posting is greater than a predetermined threshold;
  whether a number of times that explicit feedback has been provided by at least one other individual is greater than a predetermined threshold; and
  whether a degree of similarity with respect to an existing posting is greater than predetermined threshold.

11. The computer program product according to claim 2, wherein the at least one predetermined criterion is based on:
  whether time elapsed since a last login or view time by the author is greater than a predetermined threshold; and
  whether a number of replies to the posting is less than a predetermined threshold; and
  at least one of:
  whether a number of views of the posting is greater than a predetermined threshold;
  whether a number of times that explicit feedback has been provided by at least one other individual is greater than a predetermined threshold; and
  whether a degree of similarity with respect to an existing posting is greater than predetermined threshold.

* * * * *